(12) United States Patent
La France et al.

(10) Patent No.: US 8,112,661 B1
(45) Date of Patent: Feb. 7, 2012

(54) METHOD AND SYSTEM FOR CHANGING A PROTECTION POLICY FOR A DATASET IN A NETWORK STORAGE SYSTEM

(75) Inventors: David Eric La France, Santa Clara, CA (US); Colin Johnson, San Francisco, CA (US); Shraddha Sorte, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 380 days.

(21) Appl. No.: 12/364,397

(22) Filed: Feb. 2, 2009

(51) Int. Cl.
*G06F 11/00* (2006.01)
(52) U.S. Cl. .............. 714/5.1; 714/42; 714/6.1
(58) Field of Classification Search ............ 714/5.1, 714/6.1, 6.2, 6.22, 42, 44
See application file for complete search history.

(56) References Cited

U.S. PATENT DOCUMENTS

| | | | | |
|---|---|---|---|---|
| 2003/0009551 A1* | 1/2003 | Benfield et al. | | 709/224 |
| 2003/0051111 A1* | 3/2003 | Nakano et al. | | 711/162 |
| 2005/0120025 A1* | 6/2005 | Rodriguez et al. | | 707/10 |
| 2005/0193231 A1* | 9/2005 | Scheuren | | 714/5 |
| 2007/0174690 A1* | 7/2007 | Kambara et al. | | 714/13 |
| 2008/0263176 A1* | 10/2008 | Yamagami et al. | | 709/217 |

\* cited by examiner

*Primary Examiner* — Scott Baderman
*Assistant Examiner* — Sarai Butler
(74) *Attorney, Agent, or Firm* — Perkins Coie LLP

(57) ABSTRACT

Embodiments of the present invention provide a method and system for providing, in a network storage system, a topology set to a storage administrator for selection of a topology to implement a new protection policy for a dataset. A topology includes a mapping between storage objects participating to effectuate an existing protection policy and storage objects participating to effectuate the new protection policy. When a storage administrator selects a new protection policy, a storage manager automatically generates a number of topology options including a storage object participating in the existing protection policy. According to a priority rule, the storage manager determines the priority of the topologies by computing a priority indicator for each of the topologies. In certain embodiments, the topology set is displayed to a storage administrator including the priority indicator for each topology for informing the storage administrator the relative preference of each topology. The storage administrator thereby selects a topology for configuring storage objects to participate in effectuating the new protection policy.

23 Claims, 13 Drawing Sheets

METHOD AND SYSTEM FOR CHANGING A PROTECTION POLICY FOR A DATASET IN A NETWORK STORAGE SYSTEM

FIELD OF THE INVENTION

The present invention pertains to data storage systems, and more particularly, to changing a protection level for a dataset by changing the dataset's protection policy.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2009, NetApp, Inc., All Rights Reserved.

BACKGROUND

A storage server provides access to data that is stored on one or more storage devices connected to the storage server, such as disk drives ("disks"), flash memory, or other storage devices. A storage server may be configured to operate according to a client/server model of information delivery to allow many clients to access data stored on the storage server. In this model, the client may comprise an application executing on a computer that "connects" to the storage server over a computer network, such as a point-to-point link, shared local area network, wide area network or virtual private network implemented over a public network, such as the Internet. A client may access the storage devices by submitting access requests to the storage server, for example, a write "request" to store client data included in a request to storage devices or a "read" request to retrieve client data in the storage devices.

In the operation of a storage server, the storage server includes an operating system that may implement a file system to logically organize information as a hierarchical structure of logical storage units such as directories and files on a storage device (e.g., disks). Each file may be implemented as a set of data structures, e.g., disk blocks, configured to store information, such as the actual data for the file.

In a network storage system, multiple storage servers are networked or otherwise connected together to provide access to data stored on the storage devices connected to the storage servers. In this configuration, a collection of physical storage structures (e.g., a disk, a data block, etc.) or logical storage structures (e.g., a file, a directory, a volume, etc) can be spread across one or more storage servers and each such structure may be individually or in combination referred to as a "storage object". Storage objects are created by a storage administrator who may also make decisions as to how to protect data in storage objects in the event of data corruption, accidental data deletion, or disk failures.

Protection objectives may be summarized in a protection policy which describes a data redundancy setup. In particular, a protection policy may describe what data to replicate, when to replicate data, what replication techniques to employ, etc. In a data redundancy set-up, storage objects may be organized into one or more logical units, each unit referred to as a "dataset" so a protection policy can be applied to the dataset to configure and manage the underlying dataset resources uniformly. For example, such configuration and management may include storage server operations such as listing storage objects, adding storage objects, generating storage usage reports, and other operations which can be performed on a dataset. Storage objects constituting a dataset participate in effectuating a protection policy based on a storage object configuration which describes the storage object(s) that store client data, storage object(s) that store replicated data, and the type of replication relationship between storage objects.

One conventional technique in data replication is a backup, which may be a read-only, persistent, point-in-time image of data often referred to as a snapshot. In certain instances, a backup may be a copy of data, pointers to data blocks storing client data, or incremental changes to client data. In the case of snapshots, a backup provides the ability to quickly revert the state of data to a known previous point in time by virtue of being a point-in-time image. However, a backup of this type may not be an effective data protection mechanism in disaster recovery since such a backup typically involves only the incremental changes in data since a backup was last created. Thus, if the underlying data has been lost, a point-in-time image cannot serve as a replacement for the underlying data.

A second technique for data replication, mirroring, is therefore preferable in disaster recovery. A mirror provides an actual copy of the underlying data and/or the file system that organizes the data. Mirrored data can therefore be accessed to service client requests if the underlying data is no longer available. However, mirroring requires additional storage for such copied data and thus is less space efficient than backups. As used herein, replicated data is either the backup or mirror of data being protected. Data being protected may either be client data or other replicated data (e.g. a backup to be further replicated).

At certain times, a storage administrator may desire to modify the protection level of data by changing the protection policy. For example, a storage administrator may decide that certain data requires an increased level of protection. The storage administrator may then select a new protection policy corresponding to a higher level of protection (e.g. mirroring instead of backing up) which involves a new storage object configuration. When a storage administrator changes the type of replication involved, typically a new relationship between storage objects must be established. A reason for this is that the underlying physical resources (e.g. storage servers) use specific communication protocols to facilitate the transfer of data between such resources.

A communication protocol includes instructions which direct where data should be transferred and the type of data to transfer. For instance, a Qtree SnapMirror (QSM) protocol (developed by NetApp, Inc. of Sunnyvale, Calif.) facilitates the transfer of backup data between storage servers, whereas a volume SnapMirror (VSM) protocol (also developed by NetApp, Inc. of Sunnyvale, Calif.) facilitates the transfer of mirror data between storage servers. Thus, when the data replication type changes or a new storage object is included in a new protection policy, a new relationship must first be established between storage objects, and then data can be transferred to the new storage object to effectuate the new protection policy.

Conventionally, the storage administrator manually architects a configuration for storage objects so that instead of participating in effectuating the existing protection policy, they may participate in effectuating a new protection policy. In certain cases, additional storage objects may participate in the new configuration. After a new configuration is architected, the storage administrator supplies the new configuration to a storage server via an interface to the network storage system, and causes the storage sever to implement the new policy.

Special attention must be given to the storage object configuration under the new policy, however, since changing a protection policy typically has a large and critical impact on a network storage system's resources and the usage of those resources. In particular, if the storage administrator architects and implements a poorly conceived configuration, protection of client data may be affected, as well as the ability of a network storage system to service client requests. Thus, with conventional approaches, data protection and network storage system performance may depend on the skills and experiences of the storage administrator.

One example of the shortcoming of the manual techniques is that a storage administrator may implement a configuration which replicates data to a storage object with inadequate storage space. In the event of a disaster, data may be irretrievably lost if a mirror or copy of data is not available as a result of inadequate storage space.

The insufficiency of the manual technique is further evident when a storage administrator selects a new protection policy having a mirror instead of a backup. A new relationship must be established between storage objects before data can be mirrored. After the new relationship is established, data can then be copied and transferred from one storage server to another, the process referred to as a "rebaseline." However, a rebaseline may adversely impact network speed and performance if a large amount of data is copied and transferred across the network between storage objects in remote physical locations. Since a rebaseline may take as long as a period of days or even weeks depending on the amount of data copied and the speed of the network between the storage servers, a storage administrator must undergo careful planning in architecting the storage object configuration for the new protection policy.

SUMMARY

Embodiments of the present invention provide a method and system for providing, in a network storage system, a topology set to a storage administrator for selection of a topology to implement a new protection policy for a dataset. A topology includes a mapping between storage objects participating to effectuate an existing protection policy and storage objects participating to effectuate the new protection policy. When a storage administrator selects a new protection policy, a storage manager automatically generates a number of topology options including a proposed storage object configuration for the new protection policy.

According to a priority rule, the storage manager determines a relative preference of each topology by computing a priority indicator for each of the topologies. The priority indicator reflects a performance penalty associated with each option. In one embodiment, the priority indicator includes a count of rebaselines required to configure storage objects participating in the new protection policy for a topology.

In certain embodiments, the topology set is displayed to a storage administrator including the priority indicator for each topology for informing the storage administrator of the relative preference of each topology. In one example, the priority indicator is reflected in the order in which the topology options are displayed to the storage administrator, the first topology displayed having the highest priority indicator. The storage administrator thereby selects a topology for configuring storage objects to participate in effectuating the new protection policy. In that way, the storage administrator is informed of a performance penalty associated with a topology which is automatically computed by the storage manager.

Other aspects of the invention will become apparent from the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

A method and system for providing, in a network storage system, topology options to a storage administrator for selection of a topology to implement a new protection policy for a dataset is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

System Overview

Figure 1:
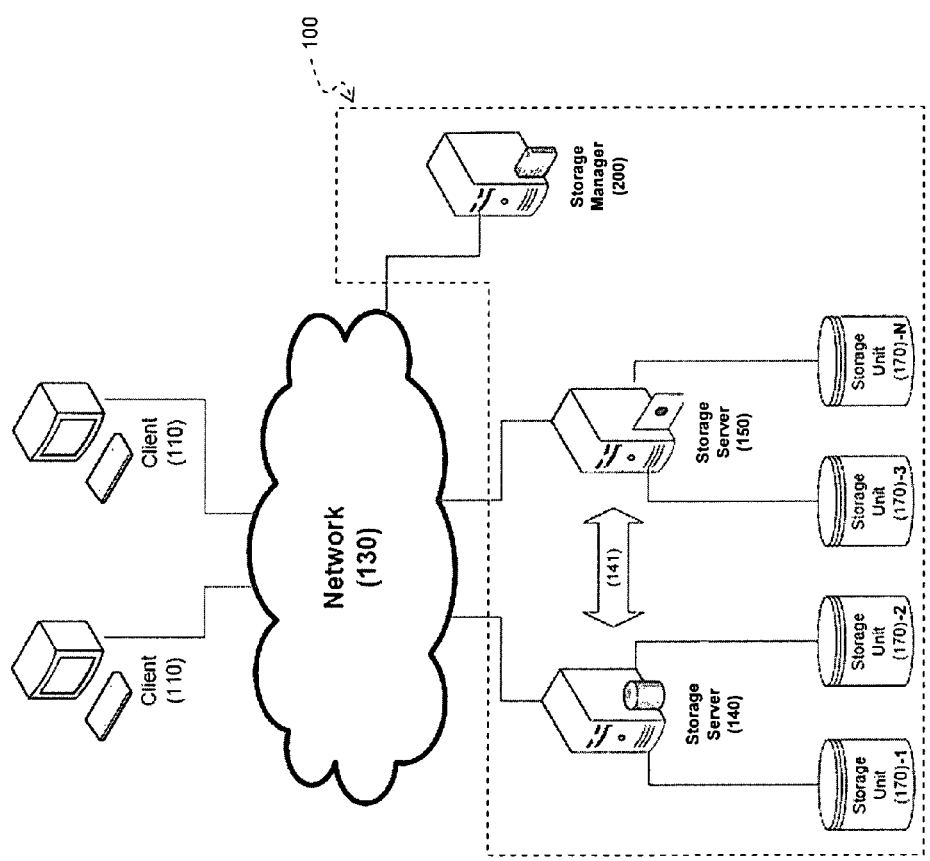
FIG. 1 is a network storage system according to one illustrative embodiment.

FIG. 1 shows a network storage system 100 in which the present invention can be advantageously implemented in one embodiment. Storage servers 140 and 150 manage multiple storage units 170 that include mass storage devices (not shown). These storage servers provide data storage services to one or more clients 110 through a network 130. Network 130 may be, for example, a local area network (LAN), wide area network (WAN), metropolitan area network (MAN), global area network such as the Internet, a Fibre Channel fabric, or any combination of such interconnects. Each of the clients 110 may be, for example, a conventional personal computer (PC), server-class computer, workstation, handheld computing or communication device, or other special or general purpose computer.

Storage of data in storage units 170 is managed by storage servers 140 and 150. Storage servers 140 and 150 receive and respond to various read and write requests from clients 110, directed to data stored in or to be stored in storage units 170. Storage units 170 are comprised of mass storage devices which can include, for example, flash memory, magnetic or optical disks, or tape drives. The storage devices in storage units 170 can further be organized as a Redundant Array of Inexpensive Disks/Devices (RAID), whereby the storage servers 140 and 150 access the storage units 170 using one or more RAID protocols known in the art.

Storage server 140 or 150 can be a file-level service such as used in a network-attached storage (NAS) environment, a block-level service such as used in a storage area network (SAN) environment, or a service which is capable of providing both file-level and block-level service. Although storage servers 140 and 150 are illustrated as single units in FIG. 1, a storage server can, in other embodiments, be comprised of a physically separate network module (an "N-Module") and disk module (a "D-Module"). In one embodiment, the D-Module includes data processing and storage access components. In contrast, the N-Module includes functionality that enables a client access to storage access components (e.g. the D-Module) and includes protocol components, such as Common Internet File System (CIFS), Network File System (NFS), or an Internet Protocol (IP) module, for facilitating such connectivity.

It should be noted that there may be different numbers of N- and D-Modules constituting a storage server in accordance with various aspects of the present invention. For example, there may be a number of N-Modules and D-Modules that do not reflect a one-to-one correspondence between the N- and D-Modules for a storage server. As such, the description of a storage server comprising one N-Module and one D-Module should be taken as illustrative only. An exemplary distributed storage server architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, which is incorporated herein by reference.

In certain embodiments, storage servers 140 and 150 are referred to as network storage subsystems. A network storage subsystem provides networked storage services for a specific application or purpose. Examples of such applications include database applications, web applications, Enterprise Resource Planning (ERP) applications, etc. Examples of such purposes include file archiving, backup, mirroring, etc. A network storage subsystem can also be implemented with a collection of networked resources provided across multiple storage servers and/or storage units.

In one embodiment, a storage manager 200 implements a protection policy in network storage system 100 for facilitating continued data services to clients even in disaster situations. Storage manager 200 is operative to communicate instructions via network 130 to storage servers 140 and 150 regarding what data to replicate, how to replicate data (backup vs. mirror), where to replicate data, when to replicate, etc. The replication relationship between storage servers 140 and 150 is managed by storage manager 200 and is indicated by data replication relationship 141.

It should be noted that there may be a number of data replication relationships between storage servers in accordance with various embodiments of the present invention. For example, storage unit 170-1 may represent one storage object from a dataset A that is mirrored onto another storage object from dataset A in storage server 150. Further, storage unit 170-2 may be a storage object from a dataset B that is backed-up onto another storage object from dataset B in storage server 150. As such, the description of a single data replication relationship between storage servers 140 and 150 should be taken as illustrative only.

During normal operations, one storage server (e.g. storage server 140) functions as a primary provider of data to a client (e.g. client 110). A second storage server (e.g. storage server 150) takes on a standby role in the data redundancy setup, replicating data in the primary storage server but not servicing client requests intended for disks accessible via the primary storage server. In disaster recovery, client requests intended for the primary storage server can then be serviced using data in the secondary storage server if the secondary storage server stores a mirror. This hand-off occurs in a "failover" operation, wherein client requests are redirected from the primary storage server to the secondary storage server. In one embodiment, storage manager 200 controls and causes the failover operation. In other embodiments, the primary and secondary storage servers themselves coordinate the failover. Thus, even in the event of a disaster, a client may continue to access its data.

System Architecture

Figure 2:
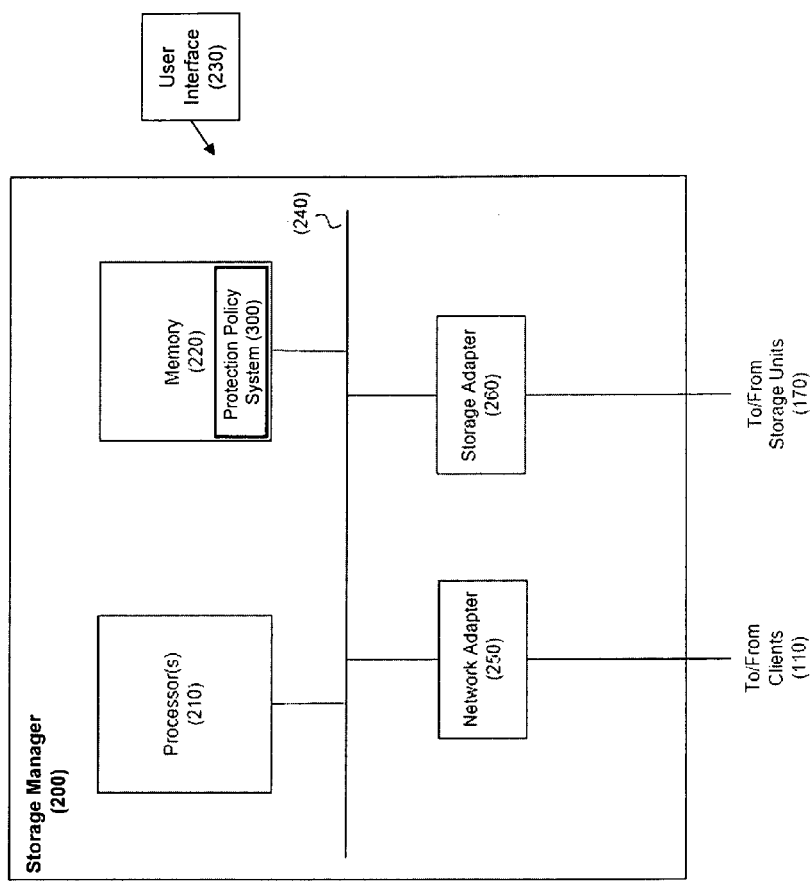
FIG. 2 is an exemplary storage manager architecture in the embodiment of FIG. 1.

FIG. 2 is a high-level block diagram showing an example of the architecture for a storage manager 200 which implements a policy protection system 300 for protecting client data in a network storage system. It will be appreciate that although storage manager 200 is shown in FIG. 1 as a physically separate system from storage servers 140 and 150, in some embodiments, storage manager 200 may be implemented in the same processing environment of a storage server in the network. In other embodiments, storage manager 200 may be implemented in the same processing environment as client 100. Accordingly, the invention is not so limited to the embodiments described herein.

In FIG. 2, storage manager 200 includes one or more processors 210 and memory 220 connected via an interconnect 240. Interconnect 240 represents any one or more separate physical buses, point to point connections, or both connected by appropriate bridges, adapters, or controllers. Interconnect 240, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

Processor(s) 210 may include central processing units (CPUs) of storage manager 200 and thus controls the overall operations of storage manager 200. In certain embodiments, processor(s) 210 accomplish this by executing firmware or software stored in memory 220. Processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 is or includes the main memory of storage manager 200. Memory 220 represents any form of random access memory (RAM), read-only memory (ROM), or the like. In use, memory 220 may contain a set of computer-executed instructions which, when executed by processor(s) 210, causes processor(s) 210 to perform operations to implement aspects of the present invention. In one embodiment, protection policy system 300 resides in memory 220 to enable storage manager 200 to provide topology options to a storage administrator as further discussed herein. Protection policy system 300 may be implemented in computer-executable software, firmware, hardware or some combination thereof, and is discussed further in reference to FIG. 3.

Memory 220 also includes computer-executable instructions for implementing a protection policy on the network storage system, including instructions for directing a storage server to replicate data on another storage server. In one embodiment, referring to FIG. 1, instructions in memory 220 enables storage manager 200 to direct storage server 140 to establish a relationship (e.g. using a protocol) with storage server 150 and backup data to storage server 150 via network 130.

Also connected to processor(s) 210 through interconnect 240 is a network adapter 250. Network adapter 250 provides storage manager 200 with the ability to communicate with remote devices, such as clients 110 over network 130 of FIG. 1, and may be, for example, an Ethernet adapter or Fibre Channel adapter. In one embodiment, network adapter 250 is connected to the network to process messages sent from storage servers 140 and 150 to storage manager 200.

In some embodiments, storage manager 200 is implemented in the same processing environment as a storage server (e.g. storage server 140 or 150). In these cases, storage manager 200 also includes a storage adapter 260 connected to processor 210 via interconnection 240. Storage adapter 260 allows processor(s) 210 to access mass storage devices (e.g. storage units 170), and may be, for example, a Fibre Channel adapter or a SCSI adapter, for servicing client requests received via network adapter 250.

In certain embodiments, a user interface 230 is connected to storage manager 200 for a storage administrator to interface with storage manager 200. User interface 230 may include command line interfaces or other means for receiving inputs from a storage administrator. In other embodiments, inputs from a storage administrator may be supplied to storage manager 200 by client 110 via network 130.

Protection Policy System

Figure 3:
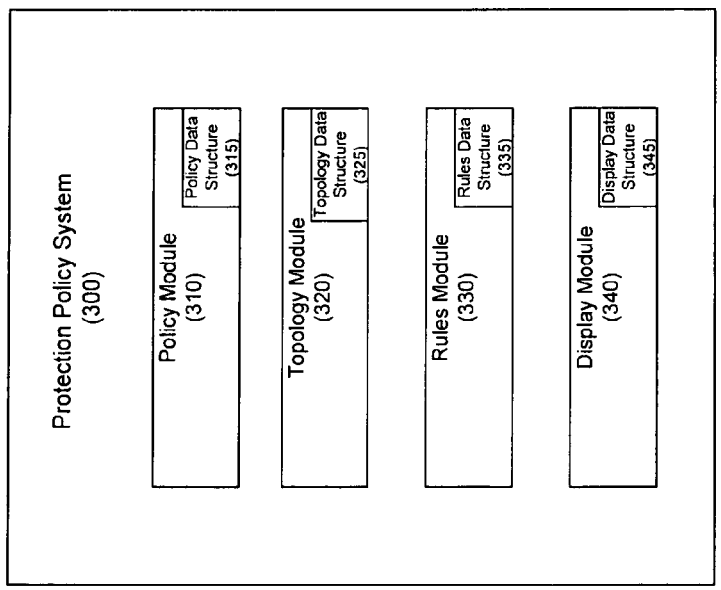
FIG. 3 is a protection policy system implemented by a storage manager according to the embodiment of FIG. 2.

Protection policy system 300 is now discussed in accordance with one embodiment of the invention as shown in FIG. 3. Protection policy system 300 includes modules such as a policy module 310, a topology module 320, a rules module 330, and a display module 340. Each module may be implemented in computer-executable software, firmware, hardware, or a combination thereof in certain embodiments.

Policy module 310 provides functionality to create, update, and/or delete protection policies. This module is operative to define and configure protection policies, and to store and access information related to existing and new protection policies. Information regarding protection policies include, for example, replication type(s) (e.g., backup, mirror), replication schedule (e.g. every 10 minutes), data transfer schedule, etc. Such information may be stored in a policy data structure 315 (e.g., a database) in persistent storage of storage manager 200. For example, each protection policy may be an entry in a database. Replication type, replication schedule, data transfer schedule, etc. may each be a field within the associated protection policy entry. In one embodiment, policy module 310 comprises computer-executable instructions stored in storage manager 200 for carrying out functions to create, update and delete protection policies. Exemplary protection policies are discussed further in reference to FIG. 4.

Topology module 320 provides functionality to create, update and/or delete topologies by which to implement protection policies from policy module 310. A topology is a logical mapping between storage objects participating in effectuating an existing protection policy and storage objects participating in effectuating a new protection policy. In the context of a topology, one or more storage objects is referred to as a "node," whereby a primary node constitutes storage objects having client data and a secondary node constitutes storage objects having replicated data. Further, a secondary node may be a backup or mirror of the primary node or of a different secondary node.

A topology data structure 325 stores information related to storage object configurations in the existing protection policy and in the new protection policy. For example, topology data structure 325 includes a database and each topology represents an entry in the database. Each entry may include fields for describing storage objects constituting nodes in the existing policy and storage objects constituting nodes in the new policy. In one embodiment, topology module 320 comprises computer-exectuable instructions stored in storage manager 200 for carrying out functions to create, update and delete such topologies. An exemplary topology is discussed further in reference to FIG. 5A.

Rules module 330 is operative to store and apply one or more priority rules on topologies created by topology module 320. A priority rule determines a performance penalty associated with a topology to which the priority rule is applied. In one embodiment, a priority rule is a computer-implemented software engine, program, or process by which a priority indicator is computed. A storage administrator, in certain embodiments, supplies one or more priority rules to rules module 330 via user interface 230.

Using a priority rule, rules module 330 associates a priority indicator with each topology for enabling quantitative comparisons between topologies. A rules data structure 335 stores, in one embodiment, computer-executable instructions for computing the priority indicator.

In one example, a priority rule is an efficiency rule which computes rebaselines required to configure storage objects in the new protection policy. If the new protection policy requires the creation of a new relationship (e.g. using a new or different protocol) between storage objects, a rebaseline is required. For instance, if storage object A is backed up to storage object B in the existing protection policy, a rebaseline is required if, under the new protection policy, storage object A is mirrored to storage object B, or storage object A is mirrored to a new storage object, e.g. storage object C.

In some instances, storage objects may use the same protocol to transfer the same type of data under both the existing and new protection policies. Using the illustration above, a topology may prescribe that storage object B, storing data mirrored from storage object A in the existing policy, also stores data mirrored from storage object A in the new policy. Under this scenario, a rebaseline is avoided since the same protocol is already used between storage object A and B to transfer the same type of data, e.g. mirrored data from storage object A. Thus, if the protocol and data type matches between two storage objects under both the existing and new protection policies, rules module 330 computes zero rebaselines for the given storage object pair. If the protocol or data type does not match, rules module 330 computes 1 rebaseline for the pair of storage objects. In certain cases, changing the replication schedule may are result in a rebaseline. Using this exemplary process, rules module 330 determines the total rebaselines required to configure storage objects for the new protection policy for a given topology.

In one embodiment, processor 210 of storage manager 200 executes instructions stored in rules data structure 335 of rules module 330 for computing whether a rebaseline is necessary. Rules module 330 may further store the priority indicator in topology data structure 325 under the appropriate topology entry to associate the priority indicator with the respective topology.

In some embodiments, rules module 330 may compute and associate more than one priority indicator for a topology using multiple priority rules. If two or more topologies are associated with the same priority indicator, rules module 330 may apply a second priority rule to prioritize equally ranked topologies. The second priority rule may associate a second priority indicator signifying a second performance penalty for further quantitative comparison.

Display module 340 comprises functionality (e.g. computer-implemented instructions stored in display data structure 345) to transform topology data into a graphical format capable of being displayed to a storage administrator, e.g. via user interface 230 (FIG. 2). This functionality is enabled, for example, using conventional graphics software by retrieving topology information from policy data structure 315 and topology data structure 325, and outputting such information to a user interface. In one embodiment, display module 340 also includes functionality for displaying the location and type of a performance penalty between storage objects in a dataset. For instance, display module may create a user interface for presenting to a storage administrator the location of a rebaseline between two storage objects participating in the new protection policy, thereby indicating increased network traffic between storage servers in the network storage system.

It will be appreciated that policy data structure 315, topology data structure 325, rules data structure 335, and display data structure 345 may be the same or different data structures. Furthermore, policy data structure 315, topology data structure 325, rules data structure 335, and display data structure 345 may be stored in the same location or different locations across the network in accordance with various embodiments of the invention.

Protection Policies

Figure 4:
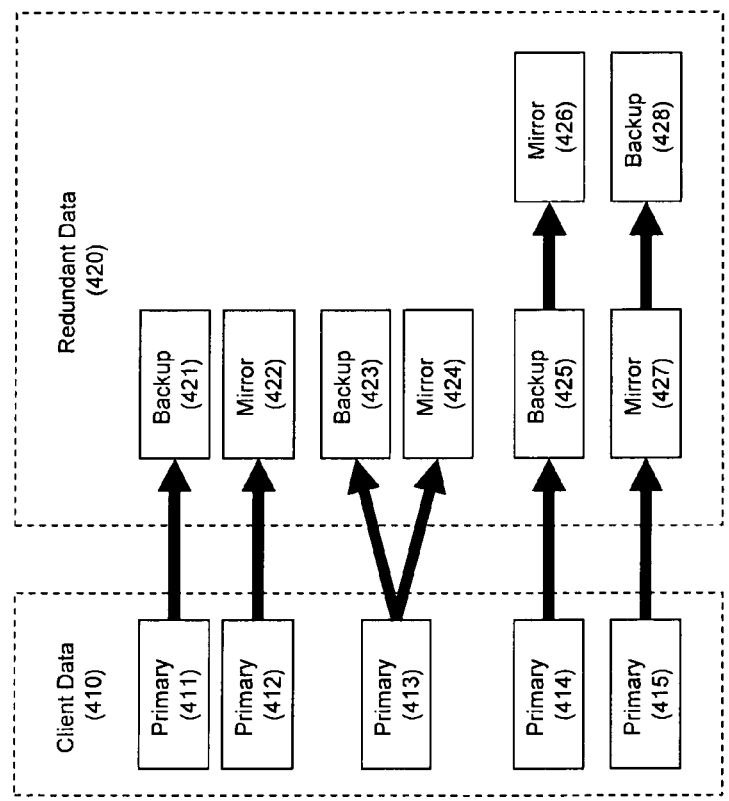
FIG. 4 is an exemplary set of protection policies.

FIG. 4 illustrates various protection policies that may be applied to a dataset. A protection policy represents client data as primary data and replicated data as secondary data. Client data 410 can be data accessed by a client (e.g. client 110 from FIG. 1) through one or more storage servers (e.g. storage server 140). Redundant data 420 can be backup or mirror data, and exists for the purpose of protecting client data 410 but not for servicing client 110 requests under normal operations. Depending on a desired level of protection by a storage administrator for a dataset, a primary-secondary node configuration can be implemented to carry out the protection objectives summarized in a protection policy.

When a lower level of protection is required and the availability of point-in-time images is the primary protection objective, primary node 411 can be backed up to a backup node 421. For higher levels of protection where disaster recovery is the primary objective, one of the following protection policies may be implemented on the dataset: (1) a primary node 412 is mirrored to a mirror node 422; (2) a primary node 413 is replicated to both a backup node 423 and a mirror node 424; or (3) a primary node 415 is mirrored to a mirror node 427, and mirror node 427 is further backed up to a backup node 428.

In certain embodiments, a storage administrator may desire backups to be mirrored to browse through the backups on a different storage server without using resources of the client-access storage server. In these cases, primary node 414 can be first backed up to backup node 425. Backup node 425 may then be further mirrored to mirror node 426.

The above examples of protection policies achieve varying levels of data protection for a dataset according to a particular protection policy. By utilizing multiple levels of data replication, the risk of unexpected data loss is thereby reduced. Using the inventive techniques discussed herein to implement a newly selected protection policy, a storage administrator is able to make a more well-informed decision as to when and how to change a protection policy, to protect data using a desired protection level, to reduce performance penalties to the network, and to facilitate uninterrupted or minimal interruption of service to clients when changing the protection policy.

Topology

Figure 5A:
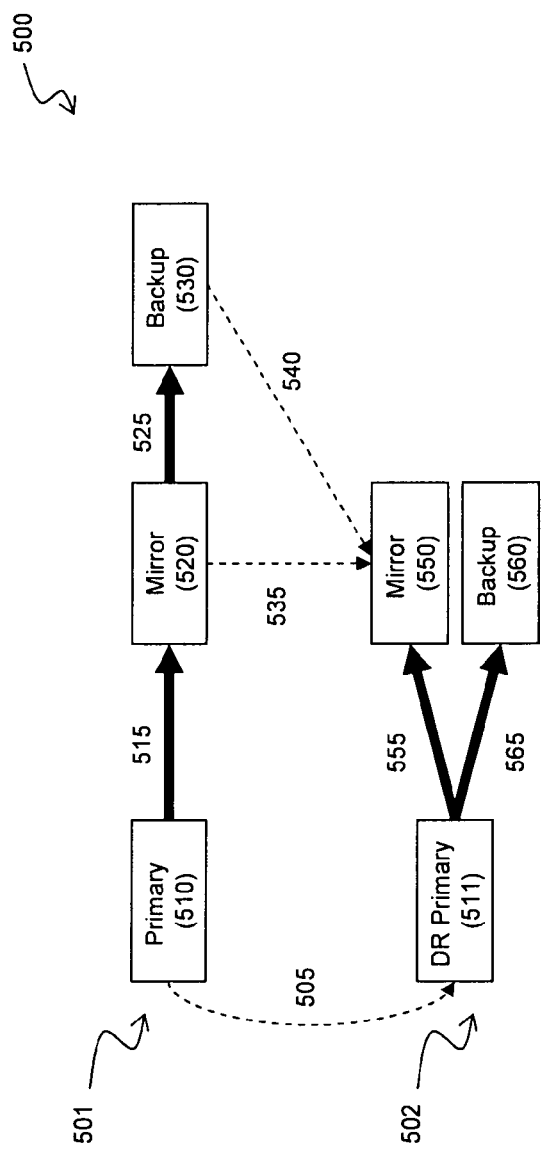
FIG. 5A is an embodiment of a mapping of nodes between an existing protection policy and a new protection policy, respectively.

FIG. 5A illustrates an exemplary topology 500 for implementing a new protection policy, which aspects of the present invention can be advantageously practiced in certain embodiments. An existing protection policy 501 is shown which prescribes that data in storage objects constituting primary node 510 is protected via a mirror relationship 515 in a secondary mirror node 520. Mirror node 520 is further backed up to a backup node 530 as indicated via a backup relationship 525.

A new protection policy 502 describing data protection in a disaster recovery situation is shown in the bottom portion of FIG. 5A. In particular, the new protection policy prescribes that when a failover occurs, client requests are serviced by a disaster recovery (DR) primary node 511 which represents the newly designated client data to be protected. The failover relationship between a primary node 510 and the DR primary node 511 is indicated by a relationship 505. Upon failing over, the new protection policy requires that DR primary node 511 be protected via mirroring to two secondary nodes, a mirror node 550 and a mirror node 560. Two full copies of client data would then be available in the event of a further disaster, e.g. failure of DR primary node 511.

In one embodiment, the new protection policy is implemented automatically upon failing over. The new protection policy may be selected by a storage administrator at any time and stored in memory for implementation at a future time. Processor-executed instructions for implementing the new protection policy upon detection of a failover may be stored in memory 220 from FIG. 2, for example, to automatically initiate configuration of the storage objects in accordance with the new protection policy. In other embodiments, the storage administrator communicates with storage manager 200 to retrieve the new protection policy stored in memory and configure storage objects upon a fail over event. In yet other embodiments, the storage administrator may select a new protection policy upon failure of a primary node for protecting data in a DR primary node.

When configuring a dataset with a new protection policy, it is generally desirable to configure storage objects to participate in the same capacity (backup or mirror) in the new protection policy as in the existing protection policy. Changing the relationship of existing storage objects to conform to the new protection policy typically requires establishing a new relationship between such storage objects since different protocols are involved. Avoiding creation of a new relationship is further advantageous if mirrored data already exists in a storage object, thus precluding the need to copy and transfer data between storage objects. By preserving existing relationships, disruption to the network storage system for servicing client requests may be avoided.

In FIG. 5A, a new storage object relationship is avoided by reconfiguring a storage object constituting mirror node 520 to participate in the new protection policy as mirror node 550. Already stored data and the protocol used between the storage objects constituting such nodes are thereby preserved. These efficiencies, however, are not always available when changing protection policies. In certain instances, such as when a new type of node is prescribed or when a new storage object participates in the new protection policy, a new relationship between storage objects must be created. However, the automatic generation of topology options by a storage manager significantly eases the burden on a storage administrator to manually reconfigure storage objects in conformance with a new protection policy. A storage administrator may further be well-informed on the performance impact to the network storage system associated with a contemplated topology prior to configuring the storage objects.

Topology Generation

Figure 5B:
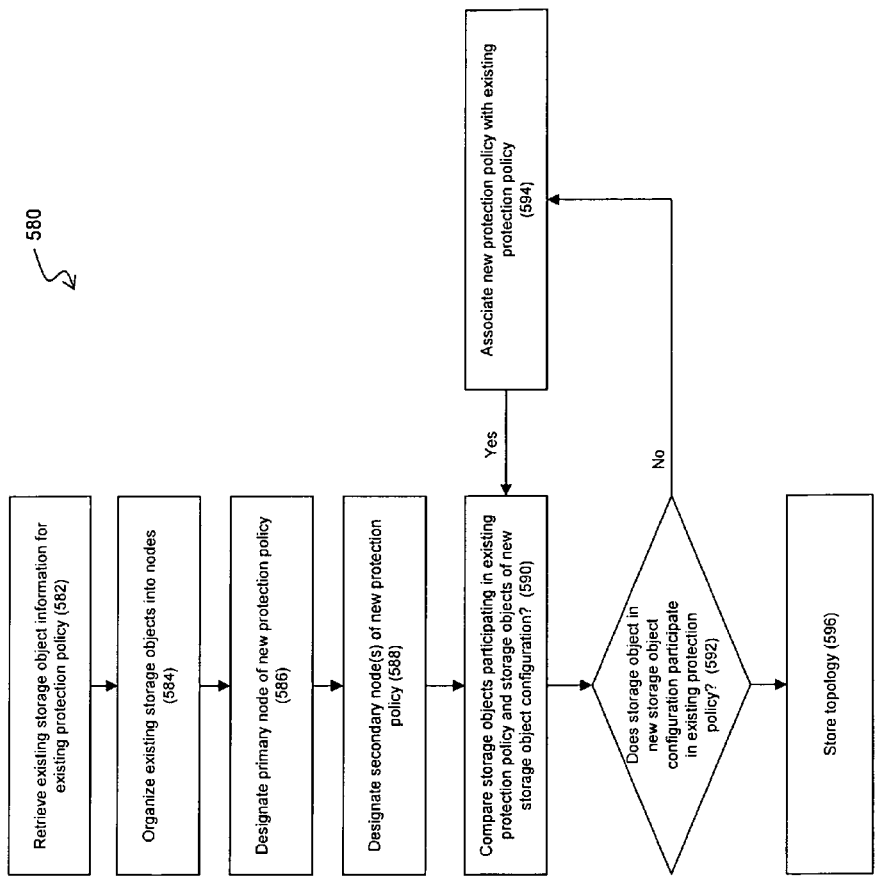
FIG. 5B is an exemplary process for generating a topology in accordance with one embodiment.

An exemplary topology generation process 580 performed by a storage manager is shown in FIG. 5B. In one embodiment, topology module 320 of storage manager 200 includes computer-executable instructions for carrying out the steps described in process 580.

In the creation of a topology, a storage manager accesses information related to storage objects in the existing protection policy (block 582). For example, such information may include a storage object's location, storage capacity, replication relationships to other storage objects, etc. and may be supplied by a storage administrator via user interface 230 from FIG. 2 with the creation of such storage objects. In one embodiment, storage object information can be stored and retrieved from policy data structure 315 in storage manager 200. The storage objects in the existing protection policy are further logically organized into nodes (block 584), whereby a storage object(s) storing client data is a primary node and a storage object(s) storing replicated data is a secondary node. Such node information can be stored in topology data structure 325, for example.

When creating a topology, the storage manager architects a relationship between two protection policies. The storage manager architects a relationship by generating a new storage object configuration in conformance with the new protection policy. Generating a new storage object configuration includes designating a protected storage object as the primary node of the new protection policy (block 586). The protected storage object is selected by the storage manager from a storage object participating in the existing protection policy. In some cases, the protected storage object may be a storage object storing client data in the existing policy. In other cases, the protected storage object may be a storage object storing mirrored data available to service client requests in disaster recovery.

A secondary node is also designated by the storage manager (block 588) in conformance with the back-up or mirroring requirements of the new protection policy. The secondary node represents replicated data and may be comprised of one or more storage objects from the existing protection policy. Alternatively, the secondary node may comprise no storage objects from the existing protection policy. In the latter case and in one embodiment, the storage administrator is prompted to supply additional storage object information to the storage manager to constitute the secondary node upon selection of a topology.

The storage manager then compares the set of storage objects participating in the existing protection policy with the set of storage objects in the proposed storage object configuration for the new protection policy (block 590). For a storage object in the new configuration, the storage manager determines whether the storage object also participates in the existing protection policy (block 592). If a storage object participates in the existing policy, this information is stored in topology data structure 325, for example, thereby associating storage objects in the existing protection policy with storage objects in new protection policy (block 594). The steps embodied in blocks 590-594 are then repeated for all the storage objects in the new storage object configuration to determine additional associations with the existing protection policy, if any. A mapping thus results from this process which comprises a mapping of storage objects in the existing protection policy and storage objects in the new protection policy. The mapping is then stored as a topology in persistent memory (block 596), e.g. in topology data structure 325.

Prioritizing Topologies

Figure 6:
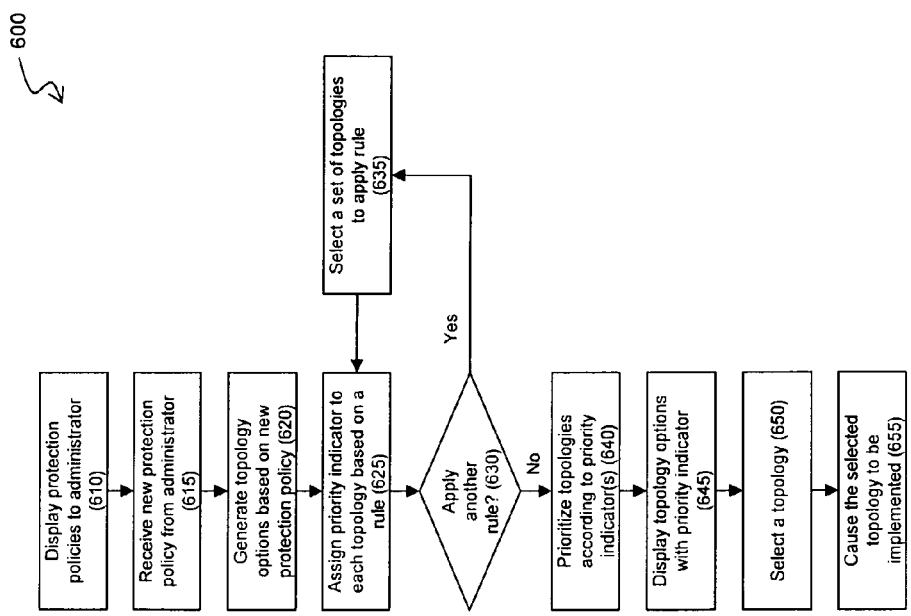
FIG. 6 is a flow diagram for providing a prioritized topology set in one embodiment.

FIG. 6 is a flow diagram of a process 600 for a protection policy system (PPS) to provide topology options to a storage administrator (administrator) for changing the protection policy of a dataset. The PPS has a graphical user interface (GUI) to receive an input from the administrator (block 610). In one embodiment, the GUI may be displayed on a user interface 230 connected to the storage manager 200 in FIG. 2. The GUI, described further in reference to FIG. 7, presents a description or graphical representation of protection policy alternatives to the administrator for selecting a new protection policy via an input device, e.g. user interface 230 (FIG. 2). The protection policies may, in one embodiment, be retrieved by policy module 310 from policy data structure 315.

The PPS next receives the administrator's input of a selection for a new protection policy (block 615). Upon receipt of the selection, the PPS may store the administrator's selection in memory of storage manager 200.

Based on the selected protection policy, the PPS generates one or more topologies for the dataset (block 620) as alternatives for implementing the new protection policy. Generating a topology includes steps of topology generation process 580 described in reference to FIG. 5B. In one example, a storage object storing mirrored data in the existing protection policy constitutes a mirror node of the new protection policy to preserve existing relationships and to avoid a rebaseline. Topology module 320 may thus store the various storage object mappings between the existing and new protection policies as topologies in topology data structure 325 for further processing described below. For each topology, topology module 320 may further associate a new node indicator for indicating that additional storage object information for a node must be supplied by the storage administrator upon selection of the topology.

Using a priority rule, the PPS computes a priority indicator for each of the generated topologies for use in determining a relative preference for each topology (block 625). In one example, the priority rule is an efficiency rule that evaluates the performance penalty associated with a topology as impact on network traffic during implementation of the new protection policy. The efficiency rule includes determining the number of rebaselines required to configure storage objects in the new protection policy by comparing, for example, the protocols or data types (mirror, backup) between storage objects constituting nodes in the new policy. Since a rebaseline implies more traffic across a network and thus potentially competes with client requests across the network, a topology requiring less rebaselines would be preferable.

In another embodiment, the priority rule is a storage capacity rule which evaluates the capacity of a contemplated storage object in the new policy. Storage capacity may be important when critical data is mirrored to a contemplated storage object, and it is desirable for the contemplated storage object to provide sufficient storage capacity for such purposes. According to one implementation, instructions in rules data structure 335 of rules module 330 are executed by processor 210 of storage manager 200 to retrieve storage capacity data for the existing and contemplated storage objects. A priority indicator is then computed as a ratio of storage capacity in the contemplated storage object to the storage capacity in the protected storage object. A higher priority indicator under a storage capacity rule is preferable since topologies with a high priority indicator will offer more storage capacity than a topology having a lower priority indicator.

In yet other embodiments, the priority rule is a relationship retention rule which evaluates existing storage object relationships maintained in the new protection policy. Here, priority is given to a topology which avoids (abandons) existing storage object relationships. A storage administrator may prefer to abandon existing relationships if storage objects without such an existing relationship are preferable in the new protection policy. For instance, relationships under the existing policy may have been established based on the physical proximity of the storage objects to a primary node for optimizing network traffic. When selecting a new protection policy for a DR primary node to which the primary node fails over, storage objects located closer to the DR primary node would be preferable for optimizing network traffic, and thus abandonment of existing relationships would be desirable.

In one exemplary application of the relationship retention rule, the storage administrator may indicate a preference to abandon or retain existing storage object relationships when selecting a new protection policy for a DR primary node. An abandonment indicator may then be stored in topology data structure 325, for example, if the storage administrator indicates a preference for abandonment. Prior to generating topologies, the PPS may verify the existence of the abandonment indicator in topology data structure 325. If the abandonment indicator is present, the PPS retrieves the relationship retention rule from rules data structure 335, for example, to prioritize the generated topologies in accordance with the storage administrator's preference.

In certain embodiments, more than one priority indicator is computed for the topologies. For example, application of a first priority rule, e.g. an efficiency rule, may result in two or more topologies having the same priority indicator, e.g. requiring the same number of rebaselines. Thus a second priority rule can be applied to equally ranked topologies, resulting in a second priority indicator to serve as a tie breaker.

Returning to FIG. 6, if another priority rule is to be applied, the PPS determines the topologies to be further processed (block 635). In one embodiment, rules module 330 selects only those equally ranked topologies to apply the additional priority rule. In applying the additional priority rule, the PPS computes a priority indicator based on the additional priority rule (block 625) and then determines whether another priority rule is be applied (block 630). For each priority rule to be applied, steps in blocks 625 through 635 are repeated until the appropriate priority rules have been applied to the appropriate topologies. Alternatively, a single composite priority indicator reflecting more than one priority factor can be computed and displayed.

Upon application of the priority rule(s), the PPS prioritizes the topologies according to the computed priority indicator(s) (block 640). In this step, display module 640 processes data from topology data structure 325, for example, into a format that can be presented to the storage administrator. Each topology may be presented with its priority indicator to inform the storage administrator that one topology is preferred over another topology. In one embodiment, the priority indicator is presented in a textual representation (e.g. best, better, good, bad) next to each topology to indicate the relative preference of each option. In another embodiment, priority indicators are reflected in the display to the storage administrator by presenting the topology alternatives in a particular order, with the first topology presented being most preferable and the last topology presented being least preferable.

At block 645, the PPS displays the topology options via a GUI (e.g. user interface 230 from FIG. 2) for aiding the selection by the storage administrator of a preferred topology. As such, the administrator may then select an automatically generated topology in a well-informed manner to implement the new protection policy (block 650).

In response to a selection in block 650, the PPS effectuates the new protection policy according to the selected topology (block 655). In certain embodiments, the PPS prompts the storage administrator to supply information relating to new storage objects participating in the protection policy that do not participate in the existing policy. Here, the administrator may create a new storage object (e.g., of specified size) and supply the new storage object information to the PPS via a user interface. Such information may, for example, be supplied via user interface 230 and stored in topology data structure 325. In certain cases, the storage administrator overrides some or all of the storage object configurations automatically generated by the storage manager for the selected topology by supplying new storage object information for a node. When nodes in the new policy have been assigned storage objects, storage manager 200 executes instructions stored in memory 220, causing storage servers to communicate with other storage servers and replicate data in accordance with the new protection policy.

User Interface

Figure 7A:
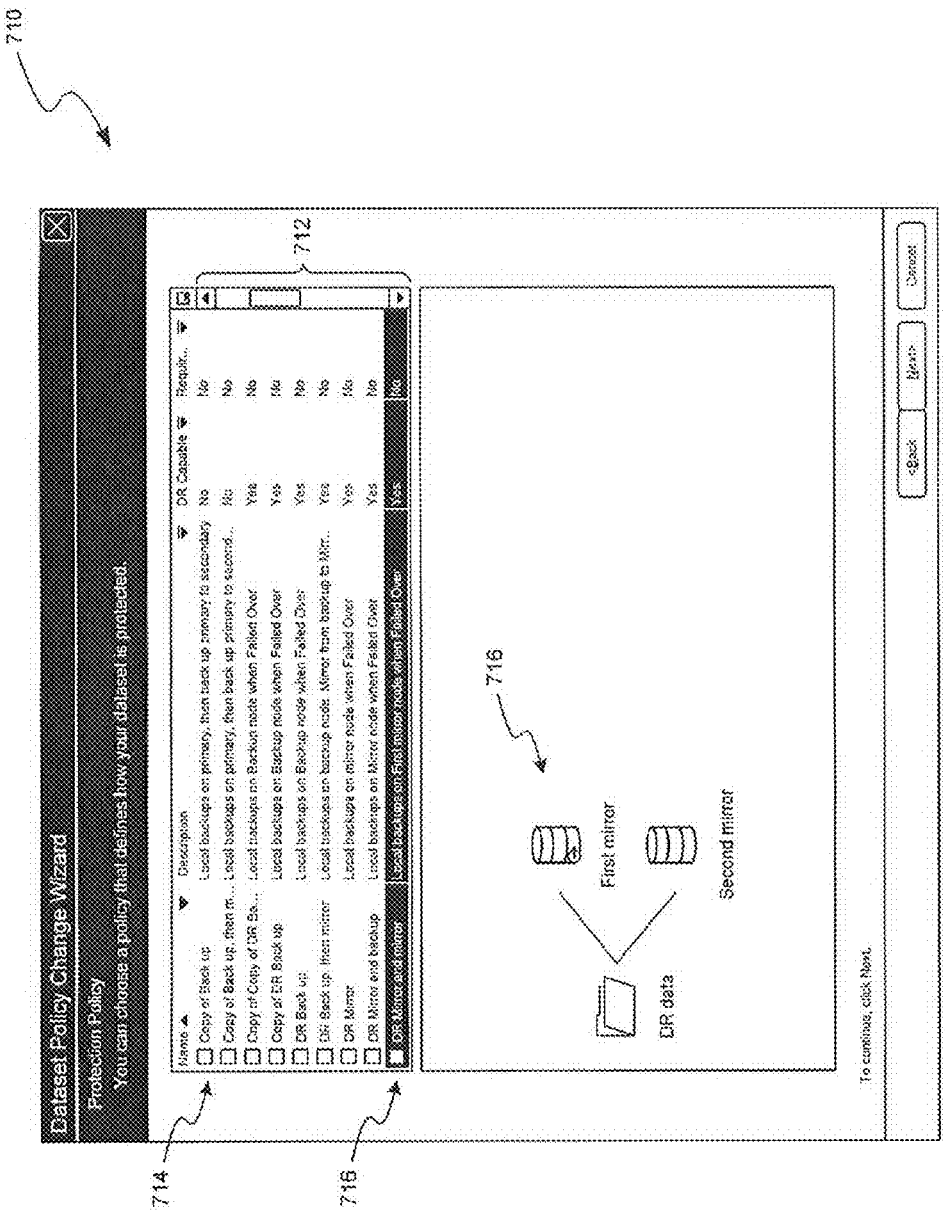
FIG. 7 is a set of graphical user interfaces for providing a storage administrator the prioritized topology set in one embodiment.

FIGS. 7A-E illustrate, in one embodiment, a series of GUIs displayed to a storage administrator for changing the protection policy of a dataset. In FIG. 7A, GUI 710 is displayed via a window interface created by PPS 300. GUI 710 includes a set of protection policies option 712 for a dataset, such as a name and brief description of each of the protection policies. In one example, protection policies option 712 includes a protection policy named "Backup" (not shown) which backs up client data in a dataset to a secondary node. In another example, protection policy 714 named, "Copy of Back up" is a protection policy in protection policies option 712 in which client data is stored on a primary node, and a backup of the client data is stored on a secondary node. As yet another example, protection policy 716 is a protection policy that is implemented only upon disaster recovery (DR) for a disaster recovery (DR) node servicing client requests after a failover. According to protection policy 716, data in the DR node is thereafter protected using two mirror nodes.

Upon selection of a new protection policy, e.g. by a storage administrator highlighting a protection policy and clicking the "Next" button, a prioritized topology set for implementing the new protection policy is provided to the storage administrator. One or more topologies are displayed according to the priority indicator of the topologies. In the exemplary embodiment, topology options are presented for protecting data in the DR node in an order wherein a topology option having the least number of rebaselines is first presented, and each topology option requiring additional baselines is presented in subsequent.

Figure 7B:
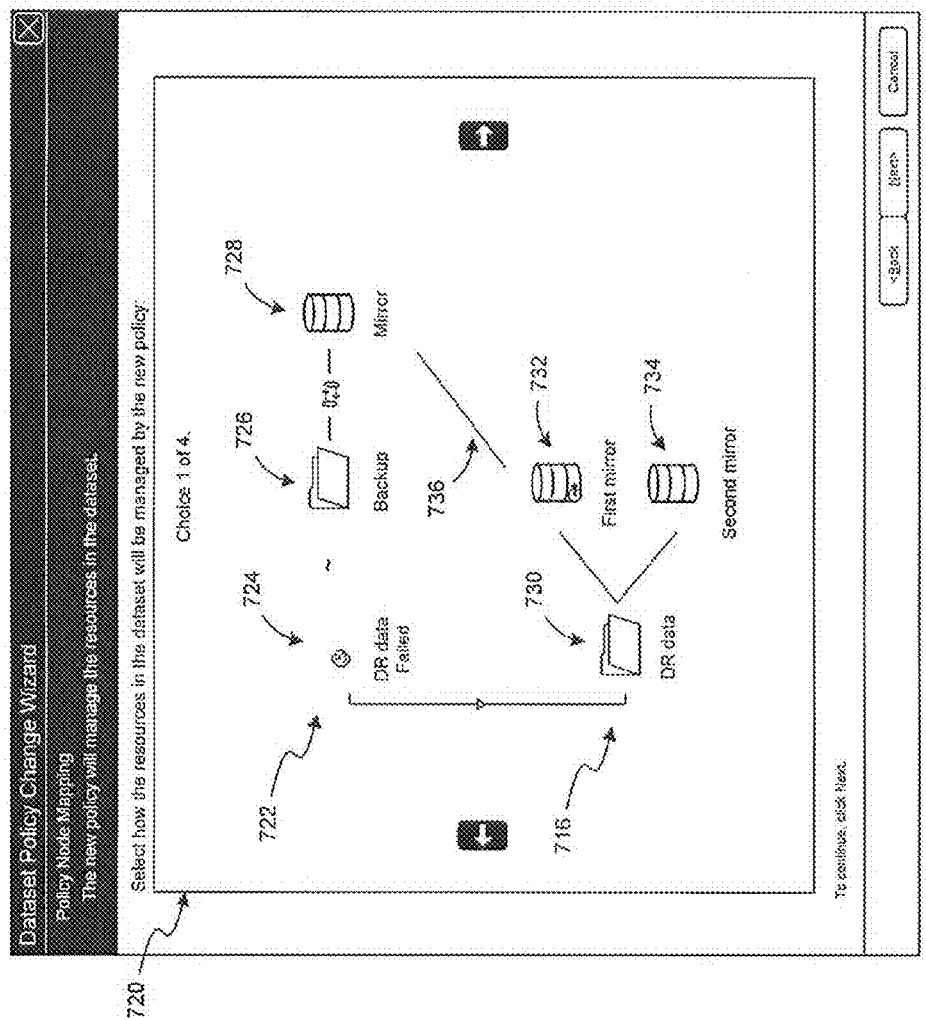

In FIG. 7B, topology 720 requires no rebaselines to reconfigure the dataset from the existing protection policy 722 to the new protection policy 716. Under the existing protection policy 722, node 724 stores client data, which is backed up to node 726. Node 726 is further mirrored in node 728. Under the new protection policy 716, client data stored on DR node 730 is mirrored to both a node 732 and a node 734. In configuring the dataset for the new protection policy, data stored in storage objects comprising node 728 may be preserved by using the same storage objects as node 732. Additionally, the communication protocol used between storage objects constituting node 728 and storage objects constituting node 732 may be preserved since both store mirrored data. Since the role of the storage object remains the same under the new protection policy, creation of a new relationship is avoided and thus no network performance penalty is shown therein.

Figure 7C:
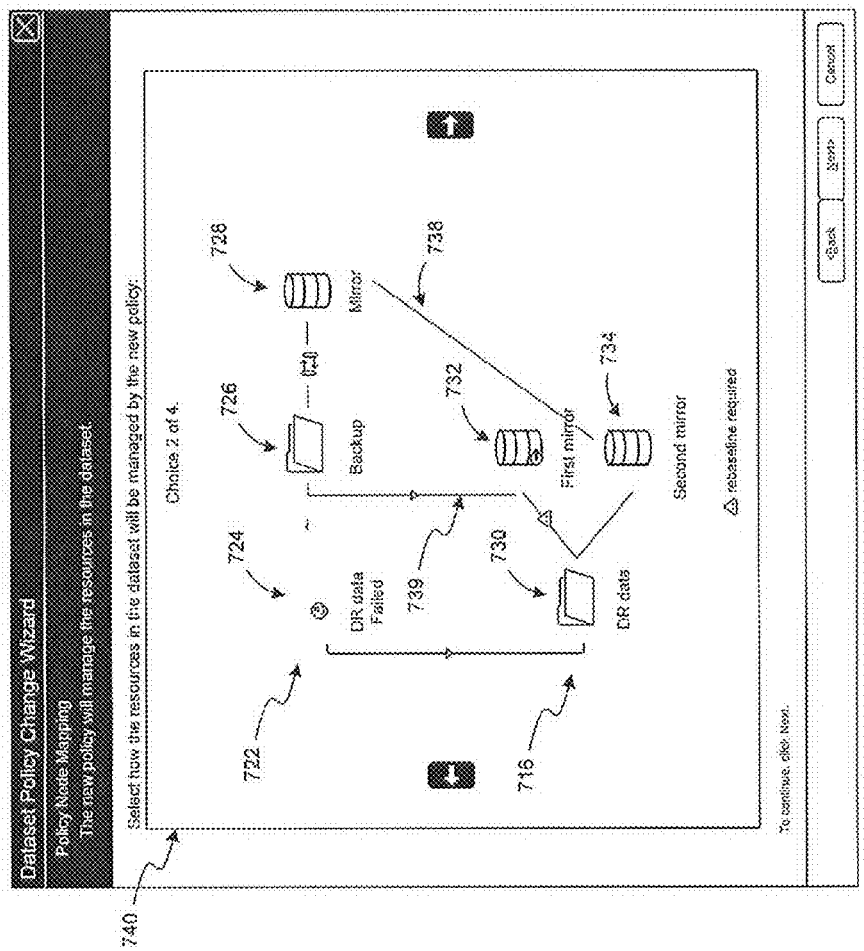

Topology 740 shown in FIG. 7C displays the next topology in the set of topology options. In contrast to topology 720, topology 740 incurs a performance penalty since a rebaseline would be required to create new storage object relationship between node 730 and node 732. Although storage objects participating in node 728 will participate in the same role (e.g. as a mirror) for node 734, as illustrated in line 738, storage objects participating as a backup node 726 will now participate as a mirror node 732. Storage objects changing from a backup to a mirror will require a rebaseline to establish a new communication protocol and transfer data from node 730 to node 732. The required rebaseline is further reflected in a graphical display via relationship 741 and informs the administrator that a performance penalty (e.g. increased network traffic between node 730 and node 732) will occur when implementing this topology.

Figure 7D:
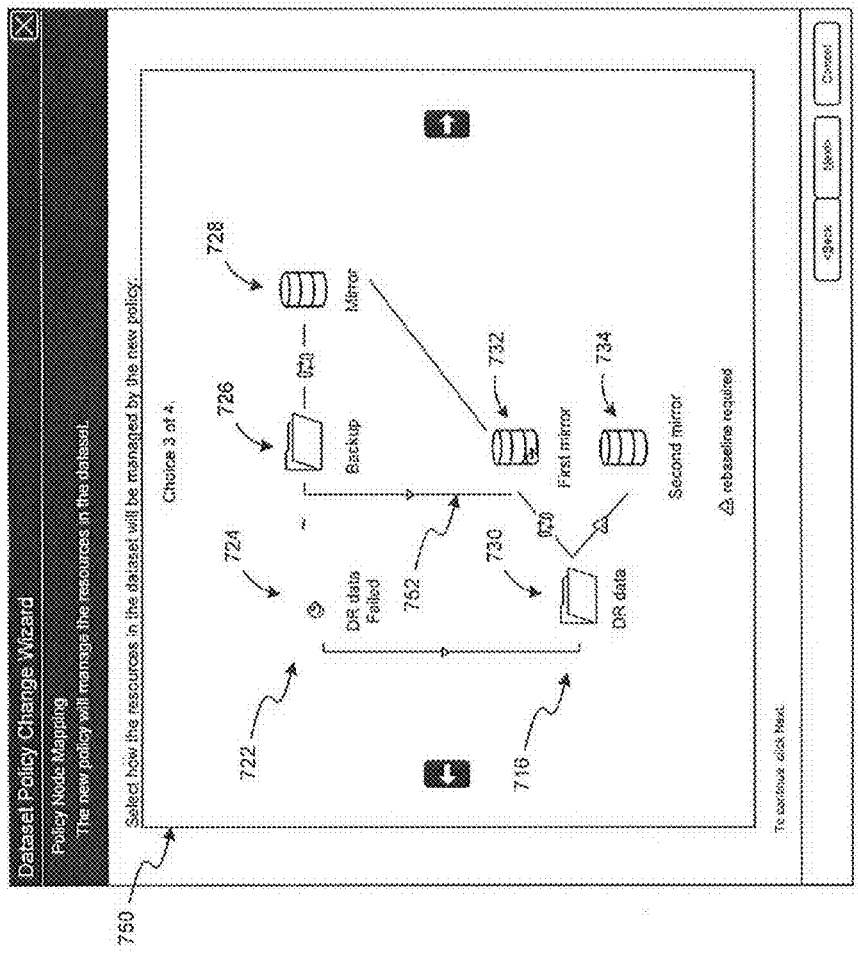
Figure 7E:
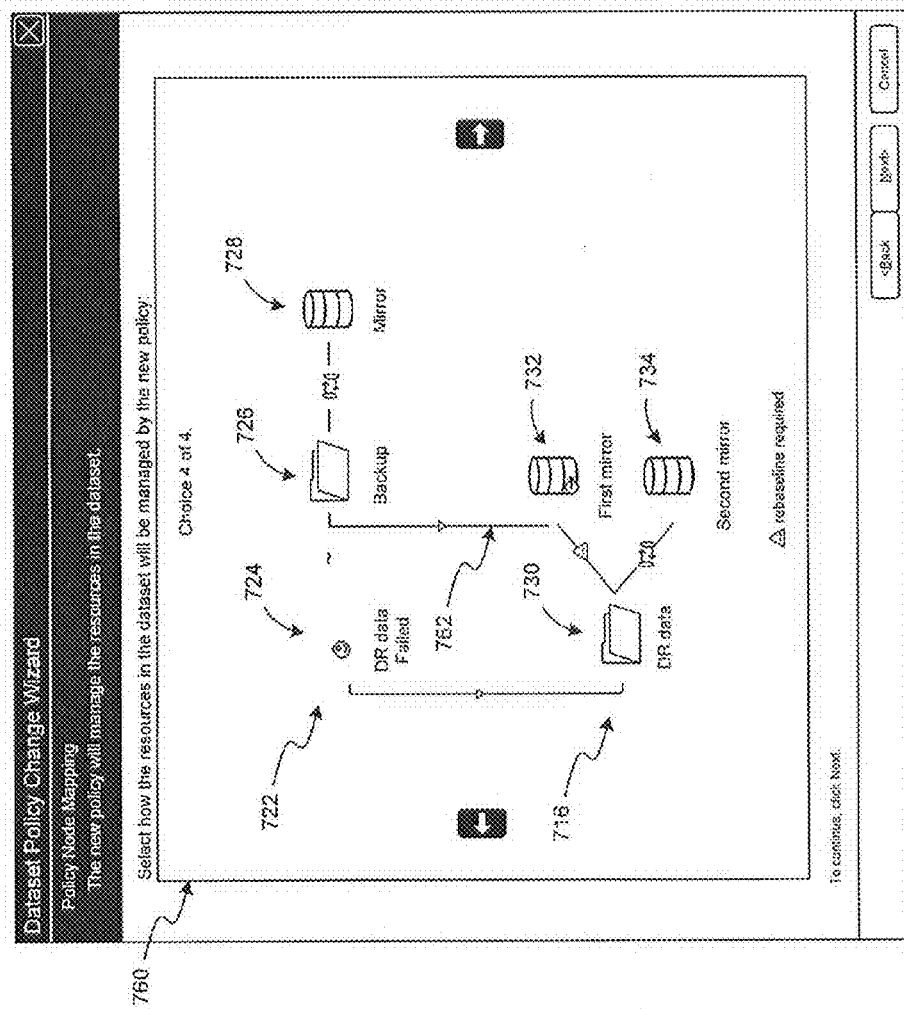

FIGS. 7D and 7E illustrate additional topologies for implementing the new protection policy, each of the additional topologies being less desirable than both topology 720 and 740 and thus shown in subsequent order. Each of FIGS. 7D and 7E display the current protection policy 722, the proposed protection policy 716, and rebaselining (if any) between nodes in the respective topologies to implement the new protection policy. In FIG. 7D, topology 750 requires a rebaseline between node 730 and node 734 when storage objects comprising node 726 are configured to participate as a mirror node 734 (shown via relationship 752). In FIG. 7E, a rebaseline is required with topology 760 when storage objects of node 726 are designated to participate as a mirror node 732 in the new protection policy (shown via relationship 762).

Storage Manager Interface Process

Figure 8:
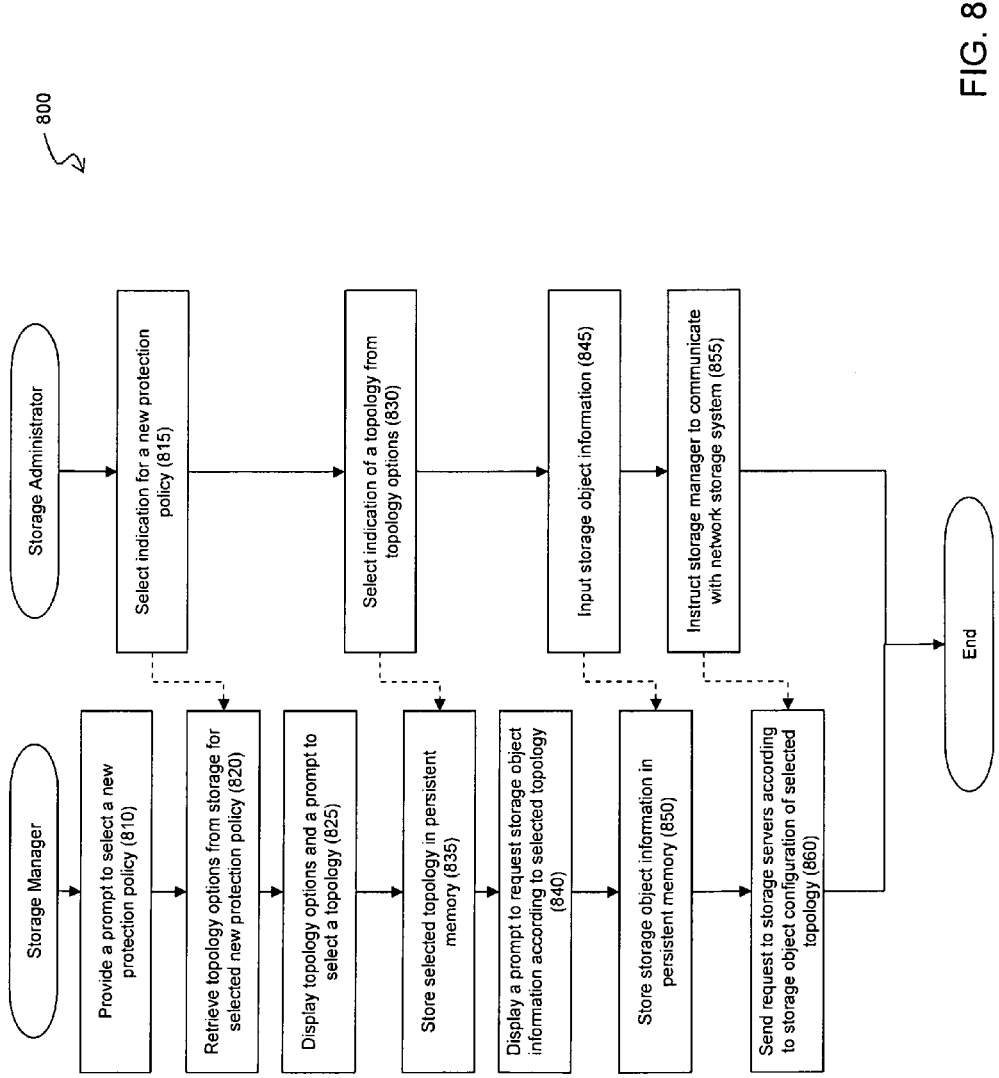
FIG. 8 is a flow diagram for a storage manager interfacing with a storage administrator in implementing a new protection policy.

FIG. 8 is a flow diagram 800 for a storage manager interfacing with a storage administrator to implement a new protection policy. Steps performed by the storage manager are illustrated on the left, and steps performed by a storage administrator interfacing with the storage manager are provided on the right. At block 810, the storage manager of a network storage system prompts a storage administrator to select a new protection policy. For example, policy module 310 in storage manager 200 creates the protection policy alternatives presented to the storage administrator. A set of protection policy options may be displayed to the storage administrator at a user interface for selection of a new protection policy. Using the user interface, the storage administrator selects an indication for a new protection policy in response to the prompt for the new protection policy (block 815).

Upon receipt of the indication by the storage administrator, the storage manager retrieves information on topology options from a persistent storage (block 820). For example, topology module 320 in storage manager 200 generates a set of topology options for implementing the new protection policy which is stored in topology data structure 325. The storage manager can therefore retrieve information on topology options from topology data structure 325. In some embodiments, storage manager generates a topology set for each new protection policy prior to selection by the storage administrator and stores the topology set in persistent memory, e.g. in topology data structure 325, for later retrieval. In other embodiments, storage manager generates a topology set for a new protection policy upon selection by the storage administrator and stores this topology set in persistent memory for retrieval. Rules module 330 may then apply priority rules (stored in rules data structure 335) to compute a priority indicator for each topology to aid the storage administrator in the selection of a preferred topology. In block 825, the storage manager displays each of the topology options and a respective priority indicator, e.g. provided by display module 340, to the storage administrator and further displays a second prompt to select a topology from the topology set (block 825).

Upon selection of an indication of a desired topology from the topology set (block 830), the storage manager stores the selected topology in persistent storage (block 835). In accordance with the selected topology, the storage manager may further prompt the storage administrator to input storage object information for constituting new nodes or for overriding the storage object configuration generated by topology module 320 (block 840). For example, a request for information may be stored in topology data structure 325. Using the interface again, the storage administrator inputs information for a storage object, e.g. a volume, to participate under the new protection policy (block 845).

The storage manager may then store the updated topology in a data structure, e.g. topology data structure 325, at block 850. To effectuate the new protection policy, the storage administrator instructs the storage manager to communicate with the storage servers in the network storage system (block 855). In one embodiment, the storage administrator causes the storage manager via a command line interface to initiate communication with a storage server. At block 860, the storage manager sends a request to a storage server to establish a new relationship, if any, with another storage server. The request may include information such as where data should be replicated, the replication type, and the replication schedule. The storage server may then copy and transmit data to another storage server in the network in accordance with the request from the storage manager. The new protection policy is thereby effectuated in the network storage system.

Using aspects of the inventive techniques described herein, a storage administrator can select a topology from a topology set for implementing a new protection policy. Storage objects may be efficiently managed to avoid unintended performance penalties while still achieving the goals of the desired protection policy. Additionally, notice of potential performance penalties during storage object configurations may be supplied to the storage administrator and readily avoided. Finally, topologies are prioritized and presented to the storage administrator based on one or more priority rules for selecting a preferred topology by which to implement the new protection policy in a well-informed manner.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A computer-implemented method for providing a topology set to a storage administrator when changing a protection policy for a dataset, the method comprising:
   receiving a selection of a new protection policy for the dataset;
   generating data that defines a plurality of topologies according to the selected new protection policy, wherein the data that defines each of the topologies comprises a mapping between a first plurality of storage objects in an existing protection policy and a second plurality of storage objects in the new protection policy;
   computing at least one priority indicator for each of the topologies according to at least one priority rule;
   storing the data that defines the topologies as a topology set in a topology data structure, each of the topologies including the computed at least one priority indicator; and
   causing each of the topologies in the stored topology set to be displayed in accordance with the at least one priority indicator for indicating a relative preference for each of the topologies.

2. The computer-implemented method of claim 1, wherein the steps of receiving, generating, computing, storing and displaying are performed by a storage manager in a network storage system.

3. The computer-implemented method of claim 1, further comprising upon a selection by the storage administrator of one of the topologies from the topology set, copying and transferring data between a plurality of storage objects of the dataset in conformance with the selected topology.

4. The computer-implemented method of claim 1, wherein for each of the topologies, the step of generating the data that defines the plurality of topologies comprises:
   retrieving information related to an existing storage object from the first plurality of storage objects from a policy data structure;
   generating data that defines a configuration of the second plurality of storage objects in accordance with the new protection policy, the second plurality of storage objects including the existing storage object;
   associating the existing storage object with the existing protection policy and the new protection policy; and
   storing the data that defines the configuration and the association as a topology in the topology data structure.

5. The computer-implemented method of claim 4, wherein a relationship between the existing storage object and a second existing storage object from the first plurality of storage objects are preserved under the new protection policy.

6. The computer-implemented method of claim 1, wherein the at least one priority indicator comprises a count of rebaselines required to implement each of the topologies in the topology set.

7. The computer-implemented method of claim 6, wherein a rebaseline comprises transferring data from a first storage object from the first plurality of storage objects to a second storage object from the second plurality of storage objects.

8. The computer-implemented method of claim 1, wherein the at least one priority indicator comprises a plurality of priority indicators, the at least one priority rule is a plurality of priority rules, and the plurality of priority indicators computed by applying the plurality of priority rules to the plurality of topologies.

9. The computer-implemented method of claim 1, wherein the step of causing each of the topologies in the stored topology set to be displayed comprises displaying a performance penalty corresponding to the at least one priority indicator for implementing each of the topologies.

10. A computer-implemented method for changing a protection policy for a dataset comprising a plurality of storage objects, the method comprising:
    allowing the storage administrator to make a selection of a topology from a topology set for implementing a new protection policy, wherein the topology comprises a mapping between a first plurality of storage objects in an existing protection policy and a second plurality of storage objects in the new protection policy;
    using a storage manager to generate data that defines a plurality of topologies comprising the topology set, each of the topologies prioritized according to at least one priority rule; and
    configuring the plurality of storage objects in accordance with the selected topology to effectuate the new protection policy.

11. The computer-implemented method of claim 10, further comprising upon selection by the storage administrator of the topology, the storage manager sending a request to a first storage server in the network storage system to copy and transfer data to a second storage server in the network storage system.

12. The computer-implemented method of claim 10, wherein for each of the topologies, the step of generating data that defines the plurality of topologies comprises:
    retrieving information related to an existing storage object from the first plurality of storage objects from a policy data structure;
    generating data that defines a configuration of the second plurality of storage objects in accordance with the new protection policy, the second plurality of storage objects including the existing storage object;

associating the existing storage object with the existing protection policy and the new protection policy; and storing the data that defines the configuration and the association as a topology in the topology data structure.

13. The computer-implemented method of claim 10, wherein the topology set is prioritized by the storage manager computing at least one priority indicator according to the at least one priority rule for each of the topologies and determining a relative preference of each of the topologies according to the at least one priority indicator.

14. The computer-implemented method of claim 13, wherein the at least one priority indicator comprises the number of rebaselines required to implement each of the topologies.

15. The computer-implemented method of claim 10, further comprising creating a user interface to receive input from the storage administrator, the input including the selection by the storage administrator for the topology from the topology set.

16. A system of providing a plurality of topologies to a storage administrator upon selection by the storage administrator of a new protection policy for a dataset, the system comprising:
a processor; and
a memory, the memory storing instructions, which when executed by the processor, cause the processor to implement:
a policy module for storing the selection of the new protection policy;
a topology module for generating data that defines the plurality of topologies, wherein the data that defines each of the topologies comprise comprises a mapping between a first plurality of storage objects in an existing protection policy and a second plurality of storage objects in the new protection policy; and
a rules module for applying at least one priority rule, the rules module configured to compute at least one priority indicator for each of the topologies according to the at least one priority rule for determining a relative preference for each of the topologies.

17. The system of claim 16, wherein the policy module, topology module, and rules module are operative in a storage manager in a network storage system.

18. The system of claim 16, wherein the topology module is operative to retrieve an existing storage object from the first plurality of storage objects and generate a configuration of the second plurality of storage objects including the existing storage object in accordance with the new protection policy.

19. The system of claim 16, wherein the at least one priority indicator comprises a count of rebaselines required to implement each of the topologies, and a first topology in the plurality of topologies having a lower rebaseline count implies a higher relative preference than a second topology in the plurality of topologies having a higher rebaseline count.

20. The system of claim 16, further comprising a display module for displaying the plurality of topologies to the storage administrator in accordance with the at least one priority rule for selection of a topology to implement the new protection policy.

21. A method of implementing a new protection policy of a dataset in a network storage system, the dataset comprising a plurality of storage objects configured according to an existing protection policy, the method comprising:
identifying a first storage object and a second storage object from the plurality of storage objects participating in the existing protection policy;

generating data that defines a topology in accordance with the new protection policy, the topology having, in the existing protection policy, the second storage object storing replicated data from the first storage object and, in the new protection policy, the second storage object also storing the replicated data from the first storage object;

storing the data that defines the topology in a topology data structure; and implementing the new protection policy in accordance with the topology, wherein a relationship between the first storage object and the second storage object under the existing protection policy is preserved under the new protection policy.

22. A protection policy performance penalty analyzer, the analyzer comprising:
a processor;
a protection policy generator to generate a plurality of new protection policies using the processor, each of the new protection policies describing a data redundancy set-up for a dataset in a network storage system;
a topology generator to generate data that defines a plurality of topologies for a new protection policy from the plurality of protection policies using the processor, each of the topologies in the plurality of topologies including a mapping between a first plurality of storage objects participating in an existing protection policy and a second plurality of storage objects participating in the new protection policy;
a rules engine coupled to the protection policy generator and the topology generator to determine at least one priority indicator for each of the topologies using the processor, the at least one priority indicator describing a performance penalty associated with each of the topologies; and
a performance penalty evaluator coupled to the rules engine to use the at least one priority indicator and the processor in determining a preferred topology from the plurality of topologies for implementing the new protection policy.

23. A method for effectuating a new protection policy for a dataset in a network storage system, the method comprising: providing, by a storage manager of the network storage system, a first prompt to select a new protection policy; selecting, by a storage administrator using a user interface to the storage manager, a new protection policy indication in response to the prompt for the new protection policy; in response to selection of the new protection policy indication, retrieving, by the storage manager, a first data structure, the first data structure comprising topology options for implementing the new protection policy; causing to be displayed, by the storage manager, each of the topology options with an associated priority indicator to the storage administrator and a second prompt to select a topology from the topology options, wherein each of the topology options includes a mapping between a first plurality of storage objects in an existing protection policy and a second plurality of storage objects in the new protection policy; selecting, by a storage administrator using the user interface, a topology indication in response to the prompt for the topology; in response to selection of the topology indication, storing, by the storage manager data representing the selected topology in a second data structure in persistent storage; causing to be displayed, by the storage manager, a prompt to the storage administrator to input storage object information for a new storage object in accordance with the stored topology; inputting, by the storage administrator, storage object information for the new storage object; storing, by the storage manager, the storage object information in the first data structure; initiating, by the storage administrator, the storage manager to communicate with the network storage system to effectuate the new protection policy; and in response to the initiation, the storage manager sending a request to a storage server to replicate and transfer data to another storage server in the network storage system to effectuate the new protection policy.

* * * * *